(12) United States Patent
Huang et al.

(10) Patent No.: US 11,470,117 B2
(45) Date of Patent: Oct. 11, 2022

(54) PHYSICAL LAYER SECURITY IN NETWORK SENSING ARCHITECTURE

(71) Applicant: NEC Laboratories America, Inc., Princeton, NJ (US)

(72) Inventors: Ming-Fang Huang, Princeton, NJ (US); Ting Wang, West Windsor, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 17/320,187

(22) Filed: May 13, 2021

(65) Prior Publication Data

US 2021/0360029 A1 Nov. 18, 2021

Related U.S. Application Data

(60) Provisional application No. 63/026,214, filed on May 18, 2020.

(51) Int. Cl.
*H04L 9/40* (2022.01)
*H04B 10/50* (2013.01)
*H04B 10/077* (2013.01)

(52) U.S. Cl.
CPC ....... *H04L 63/162* (2013.01); *H04B 10/0775* (2013.01); *H04B 10/503* (2013.01); *H04L 63/1425* (2013.01)

(58) Field of Classification Search
CPC .............. H04L 63/162; H04L 63/1425; H04B 10/0775; H04B 10/503; H04B 10/0791; H04B 10/071; H04B 10/07953; G01M 11/3127; H04J 14/02

USPC .......................................................... 398/29
See application file for complete search history.

(56) References Cited

U.S. PATENT DOCUMENTS

| 6,614,515 | B2 * | 9/2003 | Fayer ................. G01M 11/3163 356/73.1 |
| 8,045,174 | B2 * | 10/2011 | Sikora .................. H04B 10/071 356/73.1 |
| 10,727,938 | B2 * | 7/2020 | Haber .................... H04B 10/27 |
| 2005/0094129 | A1 * | 5/2005 | MacDougall ....... G01K 11/3206 356/73.1 |
| 2006/0007426 | A1 * | 1/2006 | Weller ................. H04B 10/071 356/73.1 |
| 2015/0270895 | A1 * | 9/2015 | Fink ................... H04Q 11/0067 398/16 |
| 2015/0295821 | A1 * | 10/2015 | Huang .................... H04L 45/62 398/49 |
| 2017/0063022 | A1 * | 3/2017 | Komljenovic ..... G02B 6/29343 |
| 2019/0280767 | A1 * | 9/2019 | Haber ................ G01M 11/3127 |
| 2020/0119813 | A1 * | 4/2020 | Zhang .................... H04J 14/04 |

FOREIGN PATENT DOCUMENTS

| CN | 100558013 C | * | 11/2009 | |
| EP | 3119015 B1 | * | 7/2020 | ........... H04B 10/071 |

* cited by examiner

*Primary Examiner* — Abbas H Alagheband
(74) *Attorney, Agent, or Firm* — Joseph Kolodka

(57) ABSTRACT

Aspects of the present disclosure describe physical layer security in optical telecommunications networks wherein a filtering-based physical security is provided by a wavelength tunable distributed fiber optical sensing (DFOS) system operating simultaneously on the telecommunications network.

4 Claims, 5 Drawing Sheets

PHYSICAL LAYER SECURITY IN NETWORK SENSING ARCHITECTURE

CROSS REFERENCE

This disclosure claims the benefit of U.S. Provisional Patent Application Ser. No. 63/026,214 filed May 18, 2020 the entire contents of which is incorporated by reference as if set forth at length herein.

TECHNICAL FIELD

This disclosure relates generally to optical networking. More particularly it pertains to distributed fiber optic sensing (DFOS) operating concurrently on optical telecommunications networks to provide physical layer security.

BACKGROUND

As is known, millions and millions of miles of optical fiber cable have been installed as part of communications systems. In the past thirty years alone, telecommunications carriers have constructed large scale optical fiber infrastructures to support communications including—for example—Internet traffic.

More recently, significant developments have been made in the broad area of distributed fiber optic sensing which has shown great utility when applied to any number of applications including infrastructure monitoring, oil and gas operation and earthquake detection. Such DFOS systems and methods have been shown to operate on optical communications networks carrying live communications traffic.

Given that such optical networks will not only provide a singular communications function but also sensing functions, the security of sensing data/information may be as critically important as telecommunications data. Presently, such DFOS data is vulnerable to different types of attack at a physical layer namely, physical infrastructure attacks, jamming, eavesdropping and interception.

SUMMARY

The above problems are solved and an advance in the art is made according to aspects of the present disclosure directed to systems, methods, and structures for optical networks providing distributed fiber optic sensing functions that include a filtering-based security on a physical layer of the optical network.

In sharp contrast to the prior art, systems, methods, and structures according to aspects of the present disclosure employ tunable mechanisms within an interrogator to extract sensing information from each optical networking unit (ONU) operating as part of an active telecommunications network simultaneously with a distributed fiber optic sensing (DFOS) system on the same optical fiber facilities.

BRIEF DESCRIPTION OF THE DRAWING

A more complete understanding of the present disclosure may be realized by reference to the accompanying drawing in which.

Figure 1:
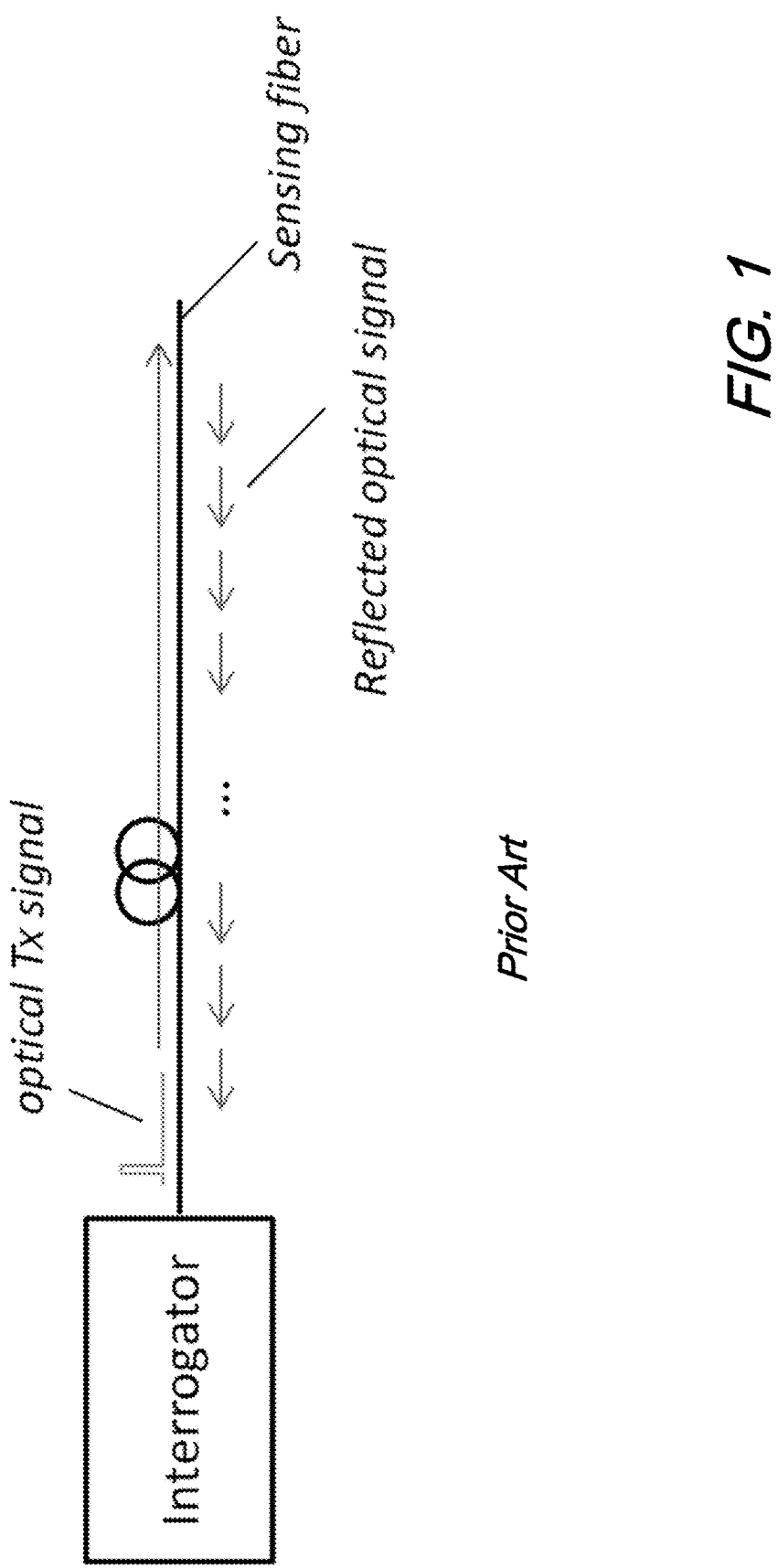
FIG. 1 shows a schematic diagram of an illustrative prior art distributed fiber optic sensing system for distributed fiber optic sensing (DFOS) as generally known in the art.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background—and with reference to FIG. 1 which is a schematic diagram of an illustrative distributed fiber optic sensing system (DFOS) generally known in the art—we begin by noting that distributed fiber optic sensing (DFOS) is an important and widely used technology to detect environmental conditions such as temperature (distributed temperature sensing—DTS), vibration (distributed vibration sensing—DVS), stretch level etc. anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Those skilled in the art will understand and appreciate further that Distributed Acoustic Sensing (DAS) using coherent optical time-domain reflectometry (OTDR) based on Rayleigh backscatter is a well-known technique for detecting acoustic vibrations.

Figure 2:
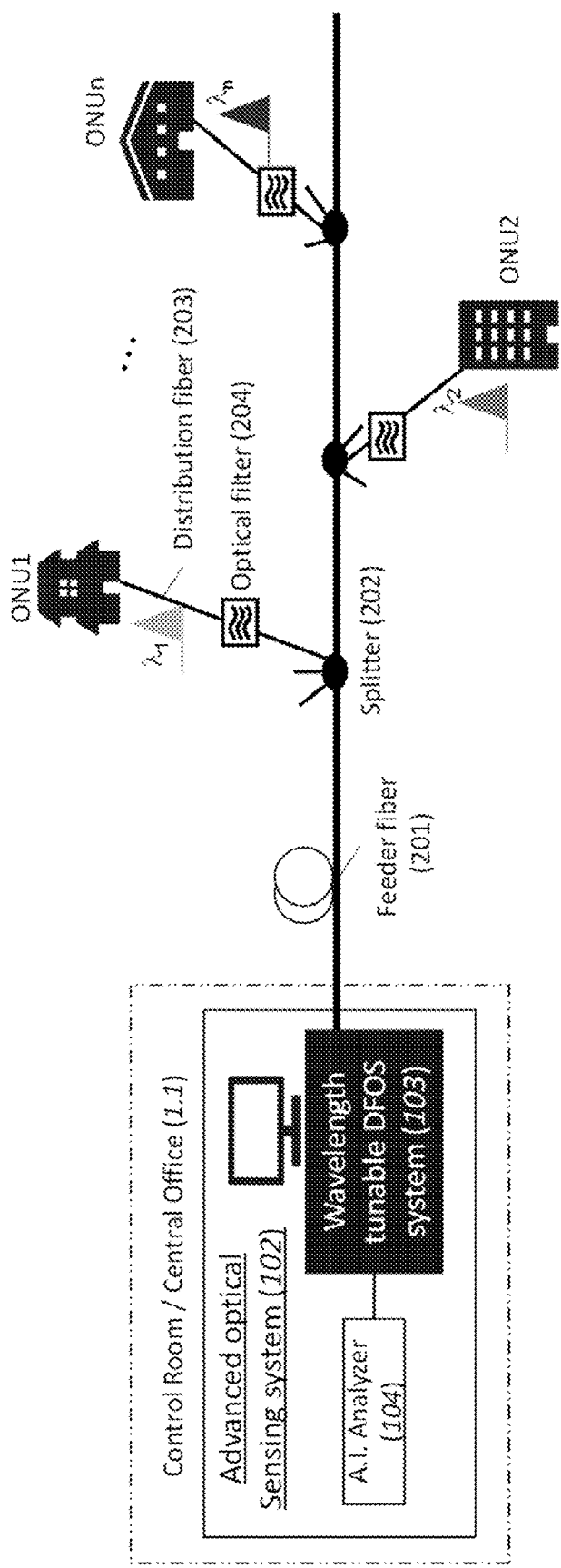
FIG. 2 shows a schematic diagram of an illustrative sensing layer overlaid on an existing data communications network—passive optical network (PON) example—according to aspects of the present disclosure.

FIG. 2 shows a schematic diagram of an illustrative sensing layer overlaid on an existing data communications network—passive optical network (PON) example—according to aspects of the present disclosure. With reference to that figure, it may be observed that an illustrative advanced optical sensing system (102) includes a wavelength tunable DFOS system (103) and A.I. analyzer (104), conveniently located in a central office (1.1) providing a remote monitoring for an individual ONU.

While not specifically shown, those skilled in the art will readily understand and appreciate that a sensing system such as that now shown and described may be easily integrated into an existing network architecture such as a PON network by using dark fibers—i.e., deployed optical fibers not carrying telecommunications or other traffic.

Typically, a PON system such as that shown includes a feeder fiber (201), a splitter (202) and distribution fiber (203) to deliver the service(s) to each ONU. In an illustrative configuration such as that shown, optical filters (204) operating in different frequency bands for each ONU may be employed. Additionally, since only service providers know the specific frequency band of an individual ONU, the specific optical links to the ONUs are generally secure. And while signal tapping may still happen in the network—the source (sensing signal from which ONU) is unknown as the "tapper" would be unaware of the specific frequency band for a specific ONU being used.

Figure 3:
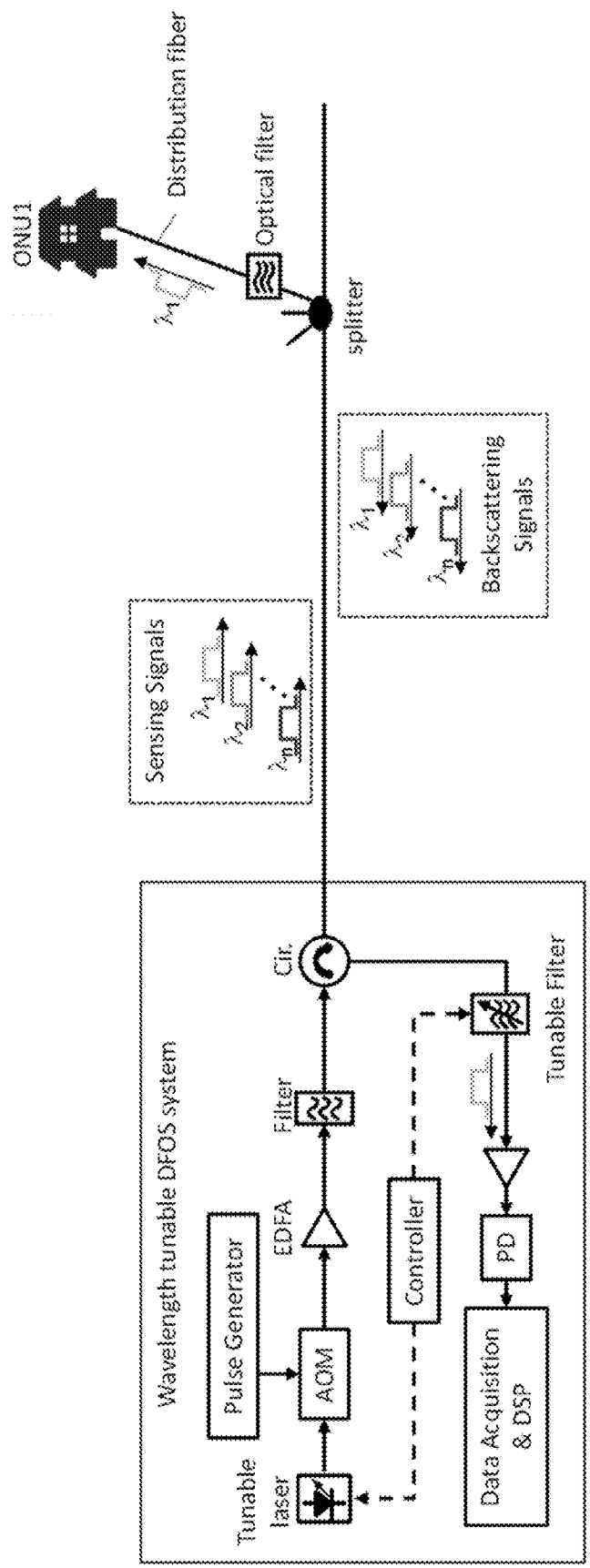
FIG. 3 shows a schematic diagram of illustrative detail for a network according to aspects of the present disclosure.

FIG. 3 shows a schematic diagram of illustrative detail for a network according to aspects of the present disclosure. The detail shown in the figure illustrates a filtering-based physical layer security according to aspects of the present disclosure.

As illustratively shown in the figure, a wavelength tunable DFOS system is shown along with an illustrative sensing fiber and an illustrative ONU, both optically connected to the sensing fiber. As will be known and understood by those skilled in the art, the DFOS system interrogator will emit sensing signals at one or more wavelengths and receive/detect/analyze backscattering signal(s) corresponding to the interrogating wavelength(s). As previously noted, individual ONUs may be interrogated with ONU specific wavelength signals.

As shown—within the illustrative DFOS system—a tunable laser (TL) is used to generate sensing pulses instead of a distributed feedback laser (DFB-LD) having a fixed frequency. During operation, the pulse wavelength is changed and aligned to DFOS pulse frequency. The wavelength tuning range ($\lambda_1, \lambda_2 \ldots \lambda_n$) of the TL depends on the frequency bands in the field (the optical network) provided by optical filters or fiber Bragg gratings (FBGs).

For example, if the pulse frequency of the DFOS system is 20K Hz for 10-km sensing distance which covers 10 OUNs, the frequency of the TL changes from $\lambda_1$ to $\lambda_{10}$ every 20K Hz. After a pre-defined frequency band of the filters (or FBG), the sensing information from ONU1 and ONU2 will be conveyed by backscattered signals of $\lambda_1$ and $\lambda_2$, respectively.

At the DFOS receiving, a tunable filter (TF) is used to select the signal from an individual ONU. The center frequency of the TF is aligned with the TL by a controller. In normal situations, the TL and TF will be swept to cover an entire set of ONUs for sensing applications. However, in a special case at ONU1 as an example, the TL and TF can be tuned to $\lambda_1$ for close monitoring.

Figure 4:
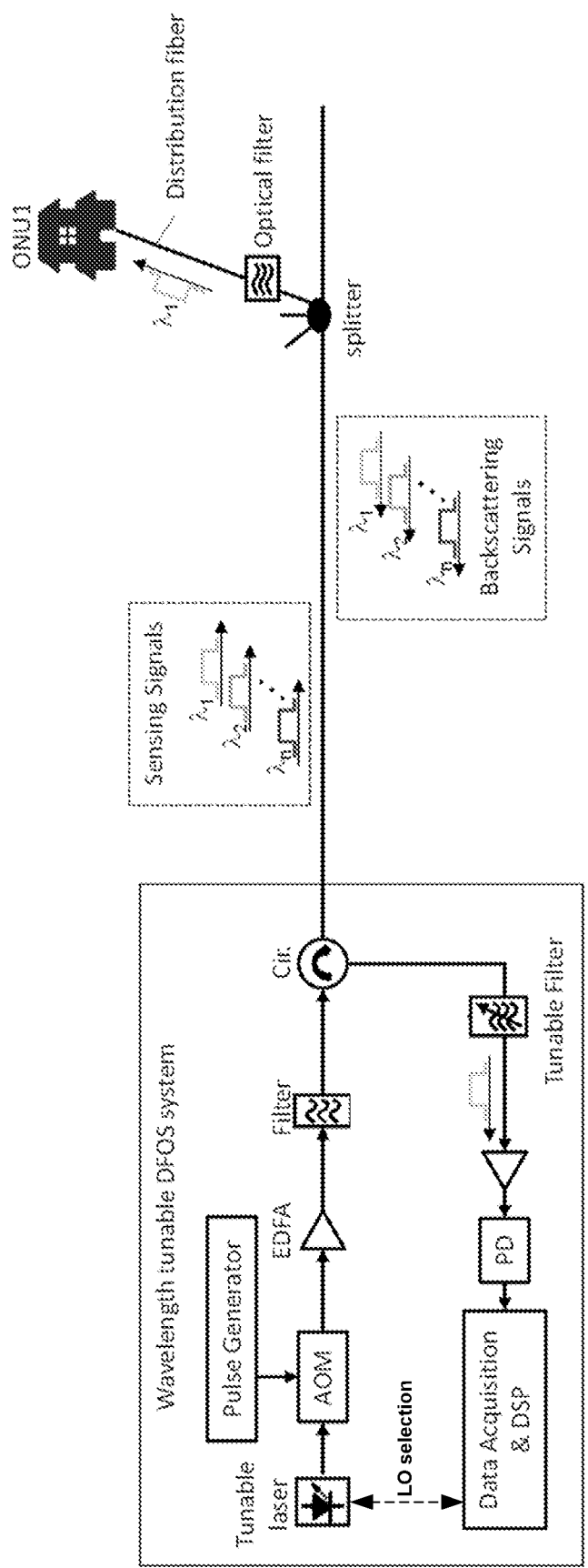
FIG. 4 shows a schematic diagram of an illustrative local oscillator-selected (LO-selected) DFOS system according to aspects of the present disclosure.

FIG. 4 shows a schematic diagram of an illustrative local oscillator-selected (LO-selected) DFOS system according to aspects of the present disclosure. Note that advanced telecommunications technology is applied to the DFOS system by coherent detection. The LO (local oscillator) selection method can be used in the proposed scheme to select the sensing signals from different ONUs. In this case, the tunable filter in the receiver side can be removed.

Figure 5:
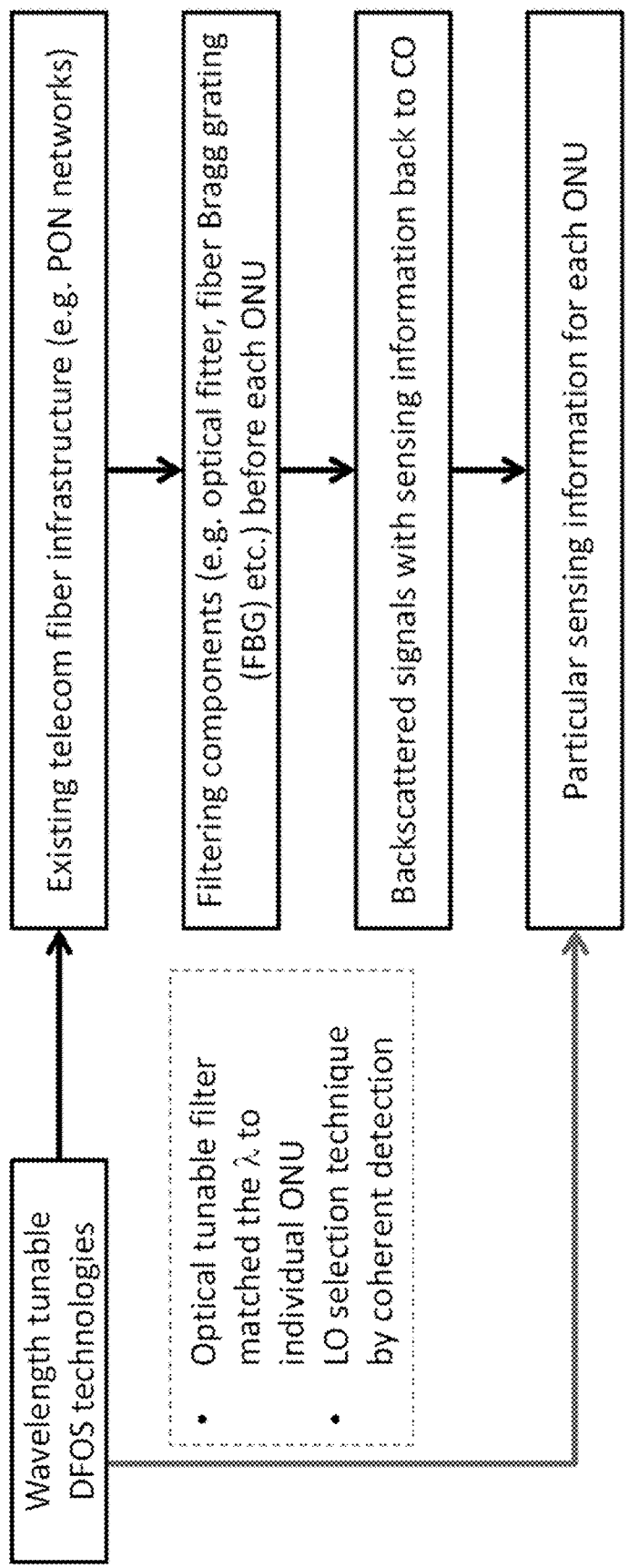
FIG. 5 shows a schematic block diagram illustrating high-level aspects of systems, methods, and structures according to aspects of the present disclosure.

FIG. 5 shows a schematic block diagram illustrating high-level aspects of systems, methods, and structures according to aspects of the present disclosure. As illustratively shown in that figure, systems, methods, and structures according to aspects of the present disclosure provide physical layer security to DFOS systems operating over telecommunications networks by employing wavelength tunable DFOS technologies wherein an optical tunable filter is used to match the interrogator wavelength to an individual optical network unit (ONU) that may reside at an individual location of service. Alternatively, a LO selection technique and coherent detection may be employed.

Operationally, filtering components including optical splitter, fiber Bragg grating(s), are located in a DFOS sensor network between the interrogator and the ONU. When so configured, backscattered signals are wavelength specific to a particular ONU as determined by the filtering component(s). Given this ONU specificity, the DFOS sensing information is specific for an individual ONU and the optical path between the interrogator and that ONU.

At this point, while we have presented this disclosure using some specific examples, those skilled in the art will recognize that our teachings are not so limited. Accordingly, this disclosure should be only limited by the scope of the claims attached hereto.

The invention claimed is:

1. A distributed fiber optic sensing (DFOS) system arrangement exhibiting physical layer security, the system comprising:

a length of optical sensing fiber;

an optical interrogator that generates optical pulses, introduces them into the length of optical sensing fiber, and receives backscattered signals from the optical fiber; and an analyzer that determines sensory information from the backscattered signals;

wherein the length of optical sensing fiber is in optical communication with one or more optical network units (ONU) and carries optical telecommunications traffic simultaneously with the optical pulses generated by the optical interrogator and backscattered signals; and the DFOS system is configured to generate tunable wavelength such that a specific wavelength is configured for interrogator optical pulses that are associated with specific backscattered signals and a specific one of the one or more ONUs;

wherein an optical filter is interposed between the optical interrogator and a particular one of the one or more ONUs, said optical filter configured to allow only a specific pre-determined wavelength of interrogator pulses to reach the particular one of the one or more ONUs;

a tunable laser generates the interrogator optical pulses exhibiting desired wavelengths;

the desired wavelengths generated by the tunable laser are associated with the particular one of the one or more ONUs;

a tunable filter is configured to filter the backscattered signals prior to detection and subsequent association with a particular one of the one or more ONUs; and a controller that is configured to adjust the tunable filter such that a center frequency of the tunable filter aligns with a center frequency of the tunable laser.

2. The DFOS system of claim 1 further comprising a coherent detector.

3. A distributed fiber optic sensing (DFOS) system arrangement exhibiting physical layer security, the system comprising:

a length of optical sensing fiber;

an optical interrogator that generates optical pulses, introduces them into the length of optical sensing fiber, and receives backscattered signals from the optical fiber; and an analyzer that determines sensory information from the backscattered signals;

wherein the length of optical sensing fiber is in optical communication with one or more optical network units (ONU) and carries optical telecommunications traffic simultaneously with the optical pulses generated by the optical interrogator and backscattered signals; and the DFOS system is configured to generate tunable wavelength such that a specific wavelength is configured for interrogator optical pulses that are associated with specific backscattered signals and a specific one of the one or more ONUs;

wherein an optical filter is interposed between the optical interrogator and a particular one of the one or more ONUs, said optical filter configured to allow only a specific pre-determined wavelength of interrogator pulses to reach the particular one of the one or more ONUs;

a tunable laser generates the interrogator optical pulses exhibiting desired wavelengths;

the desired wavelengths generated by the tunable laser are associated with the particular one of the one or more ONUs;

a tunable filter is configured to filter the backscattered signals prior to detection and subsequent association with a particular one of the one or more ONUs;

a controller is configured to adjust the tunable filter such that a center frequency of the tunable filter aligns with a center frequency of the tunable laser; and the center frequency of the tunable filter and the center frequency of the tunable laser is associated with a particular one of the one or more ONUs.

4. The DFOS system of claim 3 further comprising a coherent detector.

* * * * *